June 30, 1936.  J. S. C. NICHOLLS  2,045,993

POWER AND BRAKE CONTROL MECHANISM FOR MOTOR DRIVEN VEHICLES

Filed Feb. 24, 1936

Inventor
John S. C. Nicholls
By Arthur F. Rawdall
Atty.

Patented June 30, 1936

2,045,993

UNITED STATES PATENT OFFICE 2,045,993

POWER AND BRAKE CONTROL MECHANISM FOR MOTOR DRIVEN VEHICLES

John S. C. Nicholls, Boston, Mass.

Application February 24, 1936, Serial No. 65,185

6 Claims. (Cl. 192—3)

This invention relates to power and brake control mechanisms for motor driven vehicles and it has for its object to improve the construction and operation of mechanisms of this class.

In motor driven vehicles as commonly constructed the speed of the vehicle while in motion is varied and controlled by means of a foot operated element or "accelerator" through which the carbureter is adjusted to vary the power of the driving motor and the most common form of accelerator element heretofore provided was a plunger that was moved upwardly by a spring to reduce the speed of the vehicle and downwardly by means of the foot of the driver to increase the speed. The usual brake lever or pedal is, in most cases, disposed adjacent to the accelerator and is pushed upwardly by a spring to release the brakes and downwardly by the foot of the driver to apply the brakes.

These two control members are, as a rule, operated by one and the same foot of the driver and it is common practice for the driver to maintain that foot upon the accelerator while the vehicle is in motion so as to increase and diminish the speed as desired or required, and to shift the same from the accelerator to the brake lever or pedal when it is desired to reduce speed or stop the vehicle.

With this old construction a downward pressure and movement of the foot was made both in reducing or stopping the movement of the vehicle and also in increasing the speed thereof and this was objectionable and dangerous for the reason that in sudden emergencies requiring quick action a driver almost invariably acts involuntarily and instinctively as he would to apply the brakes. Therefore, it has frequently happened that a driver traveling with his foot on the accelerator and suddenly confronted by such an emergency has involuntarily and instinctively thrust downwardly with his foot thereby accelerating the speed of the vehicle instead of reducing the same or stopping as required to meet the emergency. From this cause alone many fatalities and serious accidents have resulted and it is the principal object of this invention to obviate the objectionable feature just referred to so as to minimize or prevent accidents due to this cause.

To these ends I have provided improvements in power and brake control mechanisms of the character described, said mechanisms being constructed and operating as set forth in the following description, the several distinguishing features of the invention being separately pointed out and defined in the claims at the close thereof.

Figure 1:
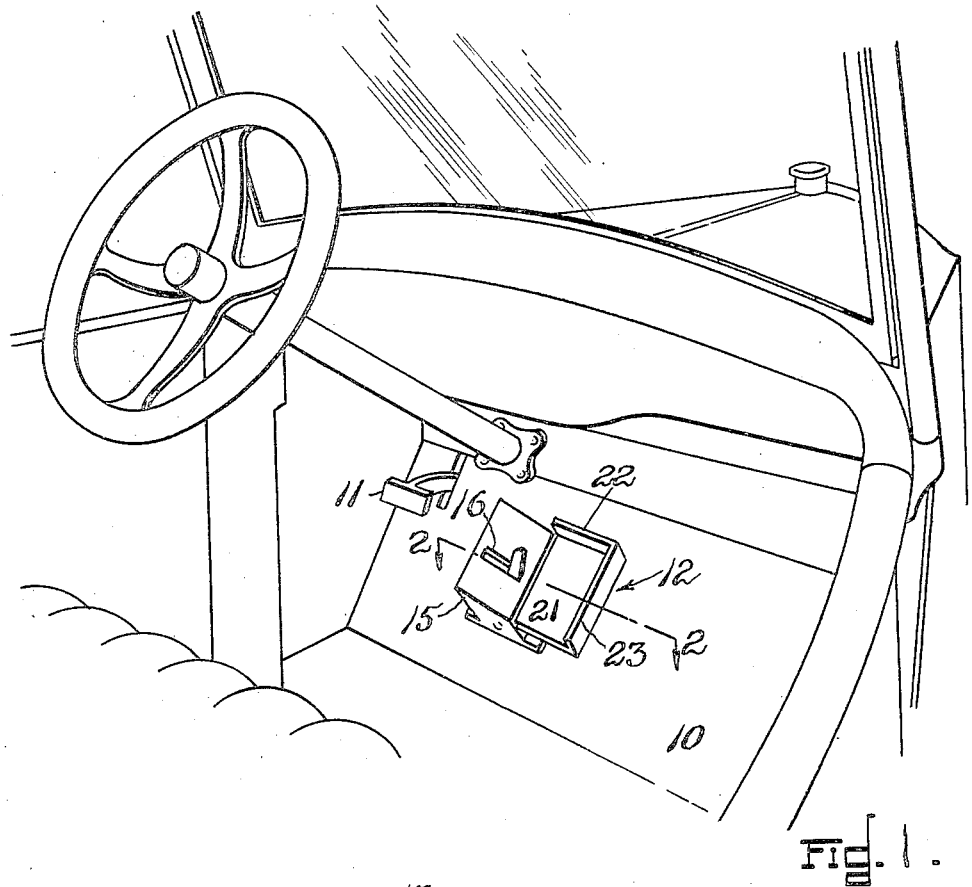
Figure 1 is a perspective view of the interior of an automobile equipped with a power and brake control mechanism constructed in accordance with this invention.

Having reference to the drawing, 10 is the usual floor board of an automobile, 11 is the clutch lever, 12 the brake lever and 13 the accelerator element through which the carburetor, not shown, is adjusted to control the power of the driving motor.

Figure 2:
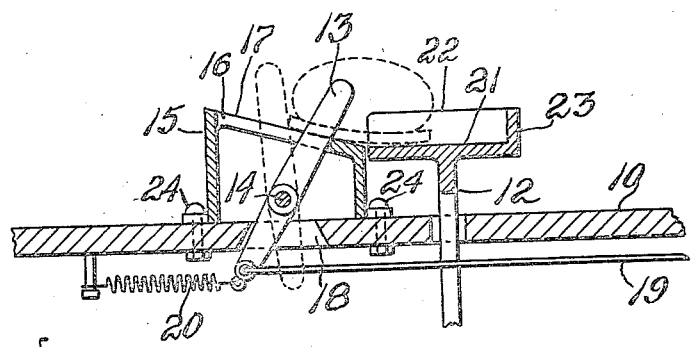
Figure 2 is a section on line 2—2 of Fig. 1.

The accelerator element 13 is herein shown as a lever pivotally mounted at 14 within a box-like foot rest 15. One arm of accelerator lever 13 extends upwardly through a slot 16 formed through the top wall 17 of the foot rest 15, said slot being disposed transversely with respect to the longitudinal median line of the vehicle and the lever 13 being movable on its pivot 14 lengthwise of this slot. The lower arm of lever 13 extends through a transverse slot 18 formed in the floor board 10 and below the latter has connected with it one end of a push rod 19 whose opposite end is connected with the element of the carburetor that is adjusted to control the power of the motor, usually the throttle of said carburetor. The lower arm of lever 13 also has connected with it one end of a spring 20 whose opposite end is fastened to the under side of floor board 10, said spring normally serving to hold the upper arm of lever 13 against one end of the slot 16 as shown in Fig. 2.

The brake lever 12 may be constructed and connected with the brakes of the vehicle as usual, except that its upper end is preferably made with a pad or foot rest 21 having an upstanding flange or lug 22 at its forward end and an upstanding flange or lug 23 at the right hand side thereof. The flange or lug 22 serves as a stop to position the foot fore and aft while the flange or lug 23 serves to maintain the foot in position laterally upon the pad 21.

The top side of the top wall 17 of foot rest 15 is approximately flat and slants downwardly toward the pad 21 of brake lever 12 and the top surface of the latter adjacent to the top of wall 17 is preferably coincident or approximately so with the top of the top wall 17 of the foot rest 15. At least the top of the pad 21 immediately adjacent to the slanting top of the wall 17 is no higher than the latter, so that the foot of the operator will be directed onto the pad of the brake lever by the top of wall 17 if said foot is slid down the latter.

The pad 21 of the brake lever is disposed close to the foot rest 15 and preferably immediately adjacent thereto. When the foot of the operator is raised while in engagement with the pad 21 of the brake lever and the latter reaches the limit of its upward movement the top surface of the pad 21 is approximately coincident with the top surface of the lowermost side of the top wall 17 so that the foot can be slid sidewise away from the pad 21 and on to the top wall 17 carrying the upper arm of lever 13 with it, as indicated by dotted lines in Fig. 2. When the lever 13 is thus adjusted on its pivot it acts through the rod 19 to adjust the carburetor so as to increase the power and speed of the motor, and as will be clear, the foot of the operator can be adjusted laterally on the top wall 17 to vary the speed as may be desired.

If in the excitement of a sudden emergency requiring application of the brakes the operator, as often happens, merely and instinctively shoves downwardly with his foot while the latter is resting upon or partly upon the top wall 17, the inclination of the latter acts as a cam to deflect the foot sidewise on to the pad 21 of brake lever 12. Thus a distinguishing feature of my new mechanism is that under such circumstances it functions automatically to transfer the foot to the brake lever resulting in the setting of the brakes. In this way my new mechanism obviates the objectionable features characterizing most of the devices heretofore provided.

In the best form of my invention the top surface of the pad 21 and the top surface of the foot rest 15 are both shown as flat and the pad 21 is disposed immediately adjacent said foot rest with its top surface coincident with and parallel with the lowermost side of the foot rest. The foot rest is secured in place upon the foot board 10 in fixed position with relation to the brake lever by means of bolts 24 or any other suitable devices while the shaft or pivot bar 14 is fixed at its opposite ends in any suitable manner to the front and rear end walls of the foot rest.

What I claim is:

1. In a mechanism of the character described, the combination with a foot-operated brake-controlling element, of a driver's foot-rest disposed alongside of said element and a power-controlling member movably supported in position to be adjusted laterally to increase the power by sidewise movement of the driver's foot away from said brake-controlling element, the top of said foot-rest slanting downwardly toward the top of said brake-controlling element so that when the foot of the driver is thrust downwardly said slanting top directs the foot sidewise in the opposite direction away from said member and on to said brake-controlling element.

2. In a mechanism of the character described, the combination with a foot-operated brake-controlling element, of a driver's foot-rest disposed alongside of said element and a power-controlling member movably supported in position to be adjusted laterally to increase the power by sidewise movement of the driver's foot away from said brake-controlling element, the top of said foot-rest slanting downwardly toward the top of said brake-controlling element so that when the foot of the driver is thrust downwardly said slanting top deflects the foot sidewise in the opposite direction away from said member and on to said brake-controlling element.

3. In a mechanism of the character described, the combination with a foot-operated brake-controlling element movable up and down to set and unset brakes, of a driver's foot-rest fixed in position alongside of said element, and a power-controlling member movably supported in position to be adjusted laterally to increase the power by sidewise movement of the driver's foot on said foot-rest away from said brake-controlling element, the top of said foot-rest slanting downwardly toward the top of said brake-controlling element so that when the foot of the driver is thrust downwardly said slanting top deflects the foot sidewise in the opposite direction away from said member and on to said brake-controlling element thereby to depress the latter and set the brakes.

4. In a mechanism of the character described, the combination with a foot-operated brake lever, of a driver's foot-rest disposed alongside of said element and in close proximity thereto, and an accelerator member movably supported in position to be adjusted laterally to increase the power by sidewise movement of the driver's foot away from said brake lever, the top of said foot-rest slanting downwardly toward the top of said brake lever so that when the foot of the driver is thrust downwardly said slanting top directs the foot sidewise in the opposite direction away from said accelerator member and on to said brake lever.

5. In a mechanism of the character described, the combination of a foot-operated brake lever constructed with a foot pad made with a toe-engaging stop at its forward end and with a stop at one side thereof for engaging the side of the driver's foot; a driver's foot-rest disposed closely adjacent to the opposite side of said pad, and a power-controlling member movably supported in position to be adjusted laterally to increase the power by sidewise movement of the driver's foot away from said pad, the top of said foot-rest slanting downwardly toward the pad of said brake lever so that when the foot of the driver is thrust downwardly said slanting top directs the foot sidewise in the opposite direction away from said member and on to said pad.

6. In a mechanism of the character described, the combination of a brake lever made at its top with a foot-pad; a driver's foot-rest disposed alongside of and closely adjacent to said pad, said foot-rest comprising a slanting top wall made with a transverse slot, and a power-controlling member movably supported in position to traverse said slot and operable to increase the power by sidewise movement of the driver's foot away from said pad, the top of said foot-rest slanting downwardly toward the top of said pad so that when the foot of the driver is thrust downwardly said slanting top directs the foot sidewise in the opposite direction away from said member and on to said pad.

JOHN S. C. NICHOLLS.